(12) United States Patent
Moore (10) Patent No.: US 7,858,895 B2
(45) Date of Patent: Dec. 28, 2010

(54) PORTABLE STUD WELDER (76) Inventor: Richard K. Moore, c/o Moore Fastening Systems, 364 Gundersen Dr., Carol Stream, IL (US) 60188

(*) Notice: Subject to any disclaimer, the term of this patent is extended or adjusted under 35 U.S.C. 154(b) by 865 days.

(21) Appl. No.: 11/468,165

(22) Filed: Aug. 29, 2006

(65) Prior Publication Data
US 2008/0053967 A1 Mar. 6, 2008

(51) Int. Cl.
B23K 9/00 (2006.01)
(52) U.S. Cl. ...................... 219/98; 219/130.1
(58) Field of Classification Search ............ 219/98, 219/130.1, 137.71, 125.1
See application file for complete search history.

(56) References Cited

U.S. PATENT DOCUMENTS

| | | | | |
|---|---|---|---|---|
| 1,779,365 A * | 10/1930 | Von Henke | | 219/89 |
| 2,779,859 A * | 1/1957 | Shoup et al. | | 219/98 |
| 2,866,076 A * | 12/1958 | Aversten | | 219/98 |
| RE24,832 E * | 5/1960 | Shoup et al. | | 219/98 |
| 2,935,595 A * | 5/1960 | Bullis et al. | | 219/98 |
| 3,365,644 A | 1/1968 | Smallman | | |
| 3,489,878 A * | 1/1970 | Wieland | | 219/98 |
| 4,117,298 A * | 9/1978 | Raycher | | 219/98 |
| 4,182,949 A | 1/1980 | Powers et al. | | |
| 4,785,159 A | 11/1988 | Hruska | | |
| 5,086,208 A | 2/1992 | Habermann | | |
| 5,233,159 A | 8/1993 | Day | | |
| 5,250,786 A * | 10/1993 | Kikuchi et al. | | 219/130.32 |
| 5,372,898 A * | 12/1994 | Atwater et al. | | 429/90 |
| 5,410,126 A * | 4/1995 | Miller et al. | | 219/130.1 |
| 6,111,215 A * | 8/2000 | Lilly | | 219/130.51 |
| 6,225,596 B1 * | 5/2001 | Chandler et al. | | 219/130.1 |
| 6,479,795 B1 * | 11/2002 | Albrecht et al. | | 219/137.2 |
| 6,713,708 B2 * | 3/2004 | Hedberg | | 219/98 |
| 6,747,246 B2 * | 6/2004 | Crandell, III | | 219/130.1 |
| 6,818,860 B1 * | 11/2004 | Stava et al. | | 219/130.1 |
| 6,825,435 B1 * | 11/2004 | Brown | | 219/112 |
| 6,977,358 B2 * | 12/2005 | Albrecht et al. | | 219/130.1 |
| 7,126,084 B2 * | 10/2006 | DeYoung | | 219/136 |
| 2003/0164357 A1 * | 9/2003 | Hedberg | | 219/98 |
| 2004/0245219 A1 | 12/2004 | Moran et al. | | |
| 2005/0109748 A1 * | 5/2005 | Albrecht et al. | | 219/130.1 |

OTHER PUBLICATIONS

International Search Report, PCT/US2007/077078, Apr. 8, 2008.

* cited by examiner

Primary Examiner—Tu B Hoang
Assistant Examiner—Hemant Mathew
(74) Attorney, Agent, or Firm—Banner & Witcoff, Ltd.

(57) ABSTRACT

A portable weld stud system is disclosed. An embodiment of the system includes a housing with a power source, which may be four twelve-volt sealed lead-acid batteries with fifty-two amp-hours of capacity. The housing includes a user interface and a set of power terminals that are coupled to the power source via a control module and a control terminal. Leads couple the housing to a weld stud gun and a work surface. A trigger on the weld stud gun allows a user to generate a drawn-arc weld between a weld stud in the weld stud gun and the work surface. The housing may include an active thermal management system and an internal charging system. The housing may further include a recess that may be covered with a removable door and is configured to accept various components such as leads, power cords, weld studs, and/or weld stud guns.

8 Claims, 8 Drawing Sheets

PORTABLE STUD WELDER

BACKGROUND OF THE INVENTION

1. Field of the Invention

The present invention relates to the field of weld stud systems.

2. Description of Related Art

Weld stud guns have proven to be highly useful for a number of applications. With a weld stud gun, an individual may place a weld stud against a metal work surface and simply by triggering the weld stud gun, cause the work surface and weld stud to become welded together. Compared to manual welding, using the weld stud gun offers the opportunity for improved reliability and speed in forming the weld. Furthermore, the weld stud gun can be set-up for a variety of work surface thickness and is suitable for use in materials where convention welding is difficult because of the tendency to burn through the work surface and/or the existence of surface contaminants.

Unfortunately, existing stud welding systems, such as drawn arc stud welding systems, generally requires connection to a suitable power source such as 110 or 220 volt AC power. Therefore, the use of weld stud guns has been somewhat limited because of the need to be coupled to a suitable power source. Furthermore, because of the need for the use of a power cord that extends from a power outlet to the weld stud system, existing designs of weld stud systems tend to pose a tripping hazard and can additionally subject the user to the potential for electrical shocks if the extension cord is damaged. Therefore, certain user would appreciate an improved weld stud system that could allow for portable use.

BRIEF SUMMARY OF THE INVENTION

A portable weld stud system is provided. A housing of the system includes a rechargeable power source. The housing includes a set of power terminals that are coupled to the power source via a solid state control module and further includes a control terminal. The control module is configured to receive a signal from the control terminal and apply a voltage across the power terminals to as to cause current to flow from one power terminal to the other. To control current flow, three mosfet circuits may be used in parallel. The housing may include an active thermal management system and may further house a charging system that may be plugged into an external alternating current source. The housing may further include one or more recesses that may be covered with a removable door and that may be configured to accept various components such as leads, weld studs, and/or weld stud guns.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

While certain portable welding devices which use capacitor discharge welding exist, such systems are generally unsuitable for welding studs to thicker work surfaces such as ¼ inch plates of steel. Instead they are at most suited for surface welds that can be used to quickly attach a stud to the surface but the resultant weld is unsuitable for supporting any significant load and typically such a device only tacks the weld stud to the surface.

Therefore, the ability to securely weld a weld stud to a work surface has instead required a connection to an alternating current (AC) source. For example, drawn arc welding is suitable for securely welding studs to thicker plates of steel.

To provide a portable weld stud system that can provide a drawn arc weld that allows the stud to support a reasonable load would, therefore, be beneficial. However, one issue that exists is providing a sufficiently portable power source that is also suitable powerful.

One technology that has provided a useful trade-off between power and weight is lead-acid battery technology. It should be noted that battery technology has progressed somewhat in recent years and a host of newer technologies have been proposed to replace lead-acid batteries. However, for industrial type operations that involve high current applications, lead-acid battery technology still has certain advantages. In addition to the ability to output high levels of current (therefore providing a high power to weight ratio), lead-acid batteries are relatively robust and do not tend to cause thermal incidents like other battery technologies such as lithium-ion battery technology. Therefore, lead-acid batteries provide advantages for harsh commercial environments. However, other energy storage technologies may also be used as a power source. For example, batteries with higher power-density then lead-acid batteries could used in combination with a capacitor so as to provide the energy storage along with the desired levels of current delivery during a welding operation.

Figure 1:
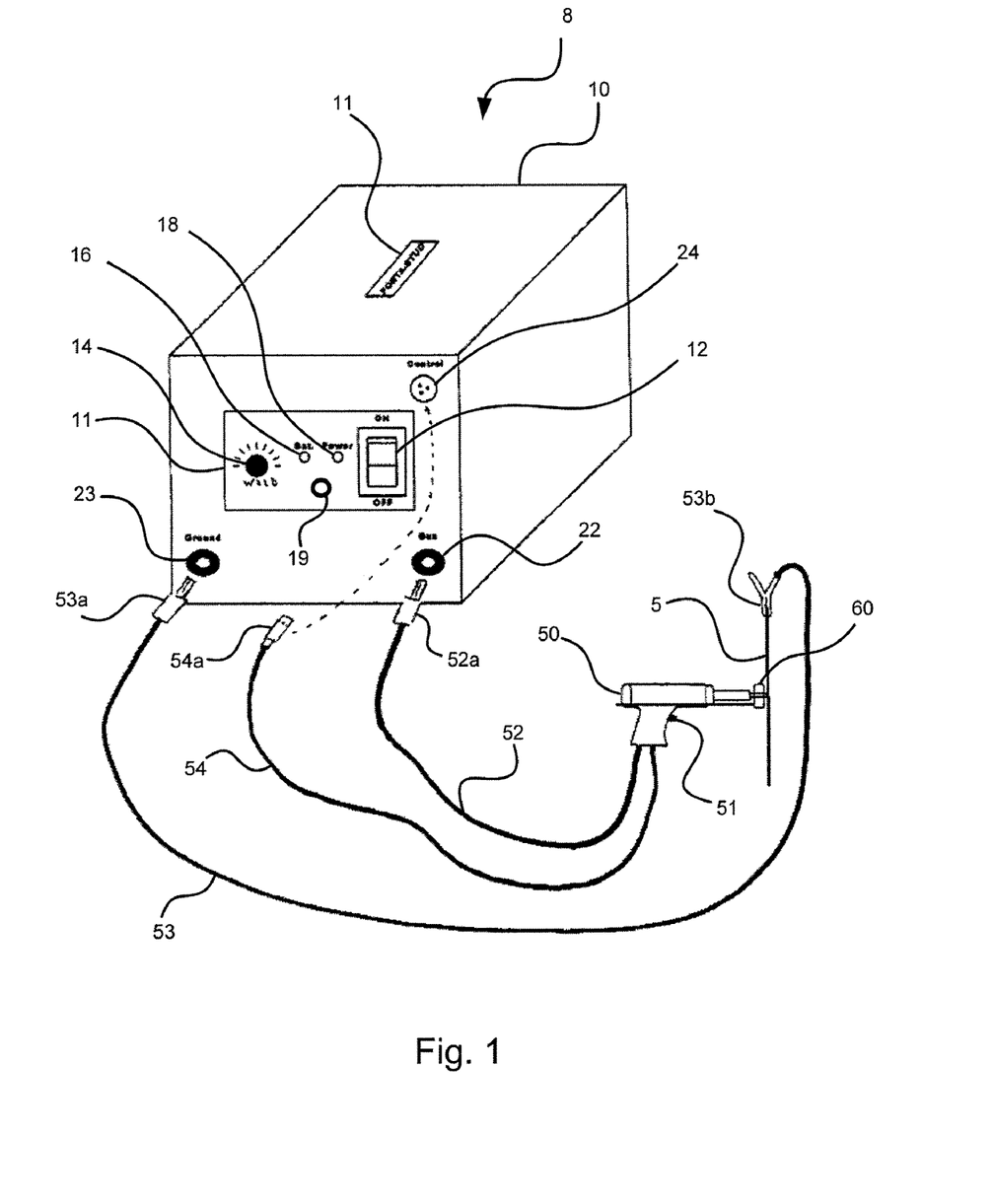
FIG. 1 is an isometric view of an embodiment of a weld stud system that may be used in accordance with at least one aspect of the present invention.

Looking at FIG. 1, an embodiment of a portable stud welding system 8 is disclosed. The system 8 includes a housing 10 with two power terminals 22, 23 and a control terminal 24. To provide information to the user, the housing 10 may further include a user interface 11 that, as depicted, includes an actuation switch 12, welding indicator light 14, a battery status light 16 and a power light 18 (which indicates whether the system 8 is on or off). Additional switches and indicators can be added as desired. The housing 10 may include one or more handles 11 for use in transporting the housing 10.

Also depicted is a weld stud gun 50 that is coupled to a power lead 52 and a control lead 54. The power lead 52 includes an end 52a that is configured to couple to the power terminal 22. The control lead 54 includes an end 54a that is configured to couple to the control terminal 24. The weld stud gun 50 further includes a weld trigger 51 that, when actuated, sends a signal along the control lead 54 and causes a voltage to be applied to the power terminal 22. A second power lead 53 includes an end 53a that is coupled to the power terminal 23 and includes a working end 53b that in operation is connected to a work surface 5. When the weld trigger 51 is actuated, the signal is sent to the housing that causes an arc to be created between a weld stud 60 on the weld stud gun 50 and the work surface 50 by applying a voltage, which may be 48 volts DC, to the two power terminals 22, 24 (and along the respective leads to the work surface 5 and the weld stud 60). Once the arc is created between the weld stud 60 and the work surface 5 (closing the circuit), the weld stud gun 50 draws the weld stud 60 back and increases the current flowing through the circuit so that a portion of the work surface 5 and the weld stud 60 becomes molten. The partially molten weld stud 60 is then plunged into the partially molten work surface 5 and the circuit is opened so that the metal can cool and hardened to provide a robust weld. In an embodiment, to adjust the length of the current pulse, a potentiometer (not shown) associated with a knob 19 can be adjusted by rotating the knob 19 so that the pulse length can be varied between 100 and 1100 milliseconds, depending on the thickness of the work surface 5. The knob 19, which is an example of a pulse adjustor, can be marked with positions for successive lengths of pulses ranging, for example, between 100 and 1100 milliseconds in 100 millisecond intervals.

Figure 4:
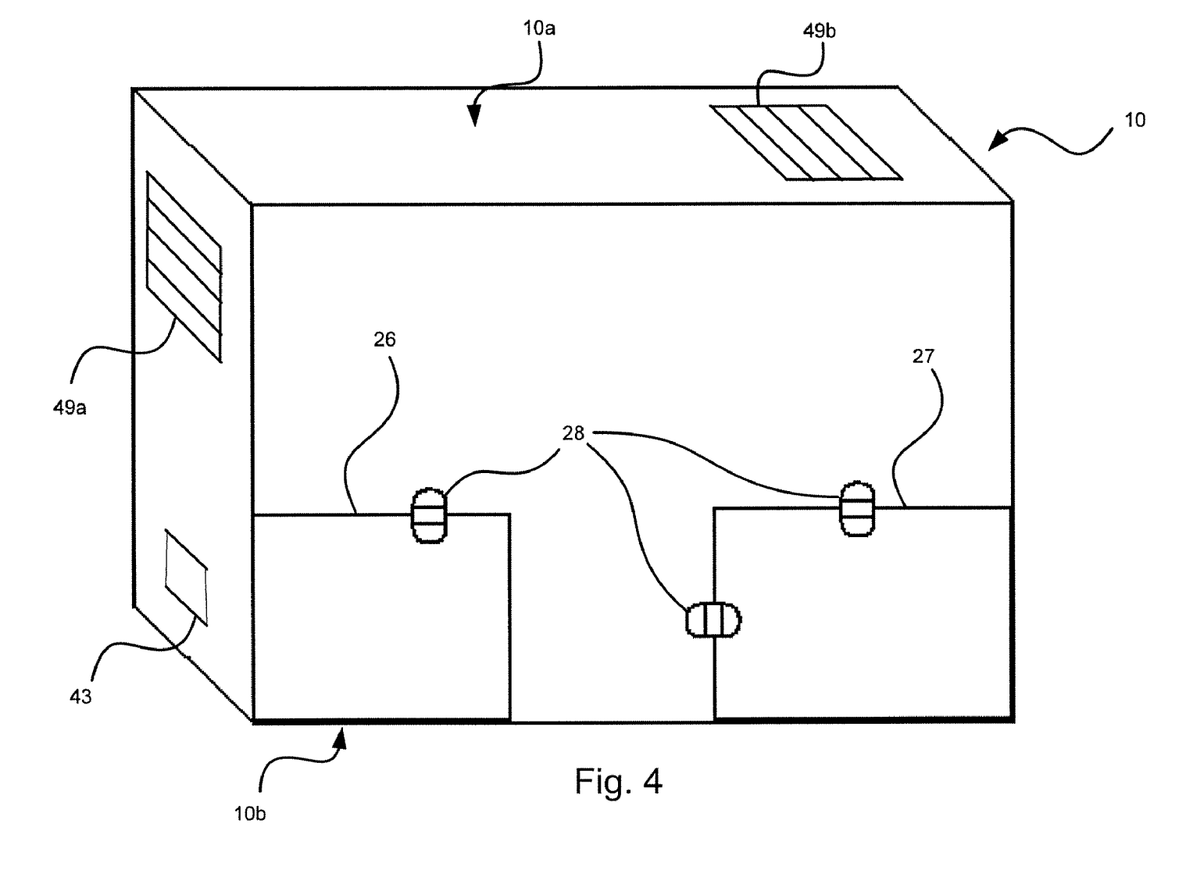
FIG. 4 is an isometric view of an embodiment of a weld stud system that may be used in accordance with at least one aspect of the present invention.
Figure 4A:
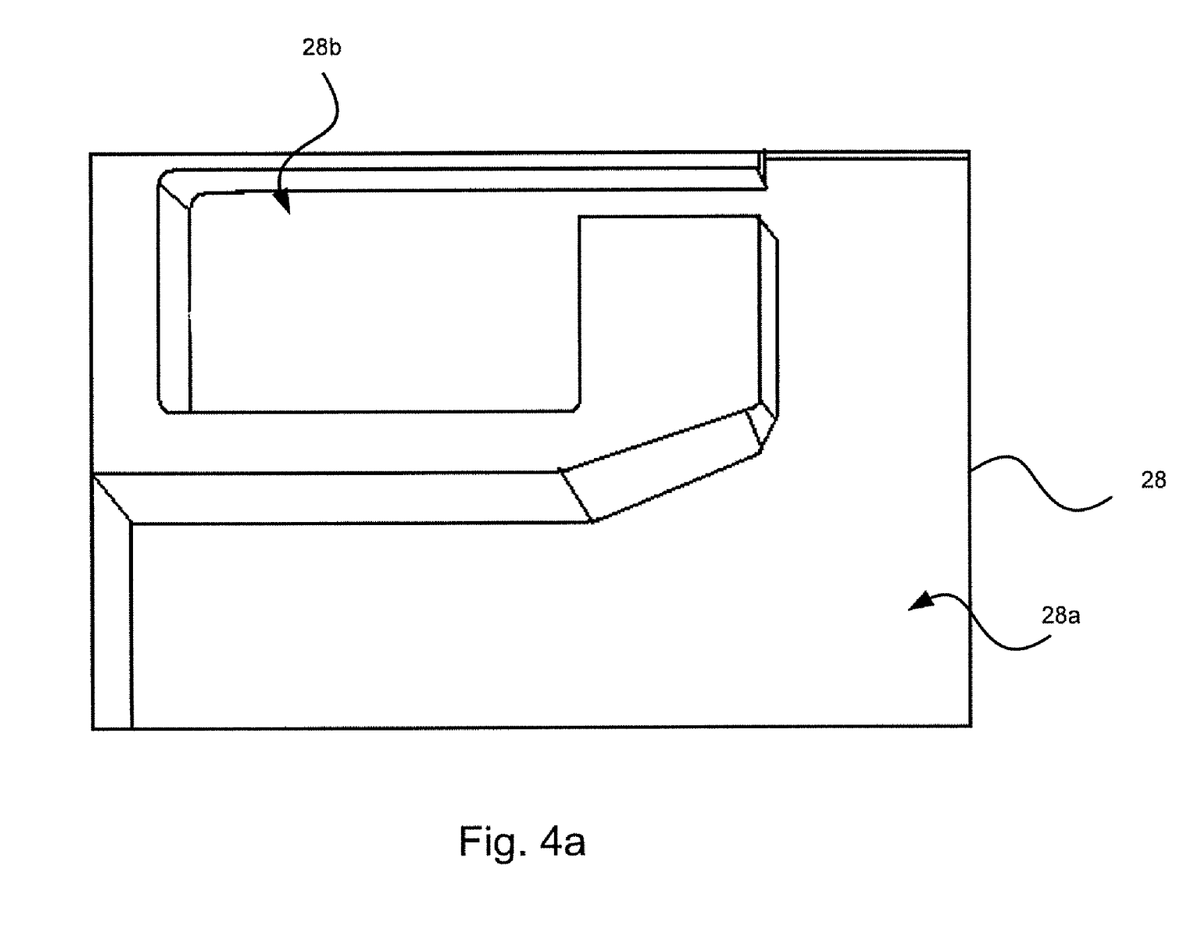
FIG. 4a is an isometric view of an embodiment of a recess in a housing that may be used in accordance with at least one aspect of the present invention.

The housing 10 may also include a door 26 and a door 27 that may be sealed with a gasket such as an o-ring to the housing 10 and held in place with one or more door fasteners 28 (as seen in FIG. 4). The doors 26, 27 may be provided to cover recesses such as a recess 28 (FIG. 4a) that may be shaped so as to receive a weld stud gun (area 28a) and the leads 52, 53, and 54 (area 28b). If desired, another recess (not shown) can be used to hold weld studs and the power cord 42 used to recharge a power source positioned in the housing 10 (if the power cord is detachable). In another embodiment, not shown, a single door may cover one or more recesses, where the covered recess(es) is configured to hold a weld stud gun, a quantity of weld studs, a power cord and leads. As can be appreciated, an advantage of the above designs is that a number of components needed to use the weld stud system can be self-contained in the housing 10 and, therefore, a single housing can contain all that is needed to weld weld studs to a work surface in a portable manner.

The housing 10 may further include an air inlet 49a and an air outlet 49b that are in communication with an interior 10c of the housing 10, wherein the air inlet 49a and air outlet 49b help provide ventilation for the interior 10c of the housing 10 so as to help keep the interior of the housing 10 cooler. To improve the effectiveness of the air inlet 49a and the air outlet 49b, a fan (not shown) that is part of a fan module 48 (FIG. 2) may be used to actively cause air to enter and exit the housing 10. Furthermore, the interior 10c of the housing 10 may be configured so that air is directed over various components, including the power source 30 and the primary control circuit 105, before exiting the housing 10. An advantage of using active thermal management system, of which the fan module 48 is an example of, is that the temperature of the power source 30 can be controlled and its usable life can be extended. In addition, an active thermal management system can be configured to automatically transfer heat in response to a temperature sensor so as to help ensure that undesirable thermal damage to other components is minimized or avoided. In an embodiment, the active thermal management system can be configured to shut down at about 180 degrees Fahrenheit.

Figure 2:
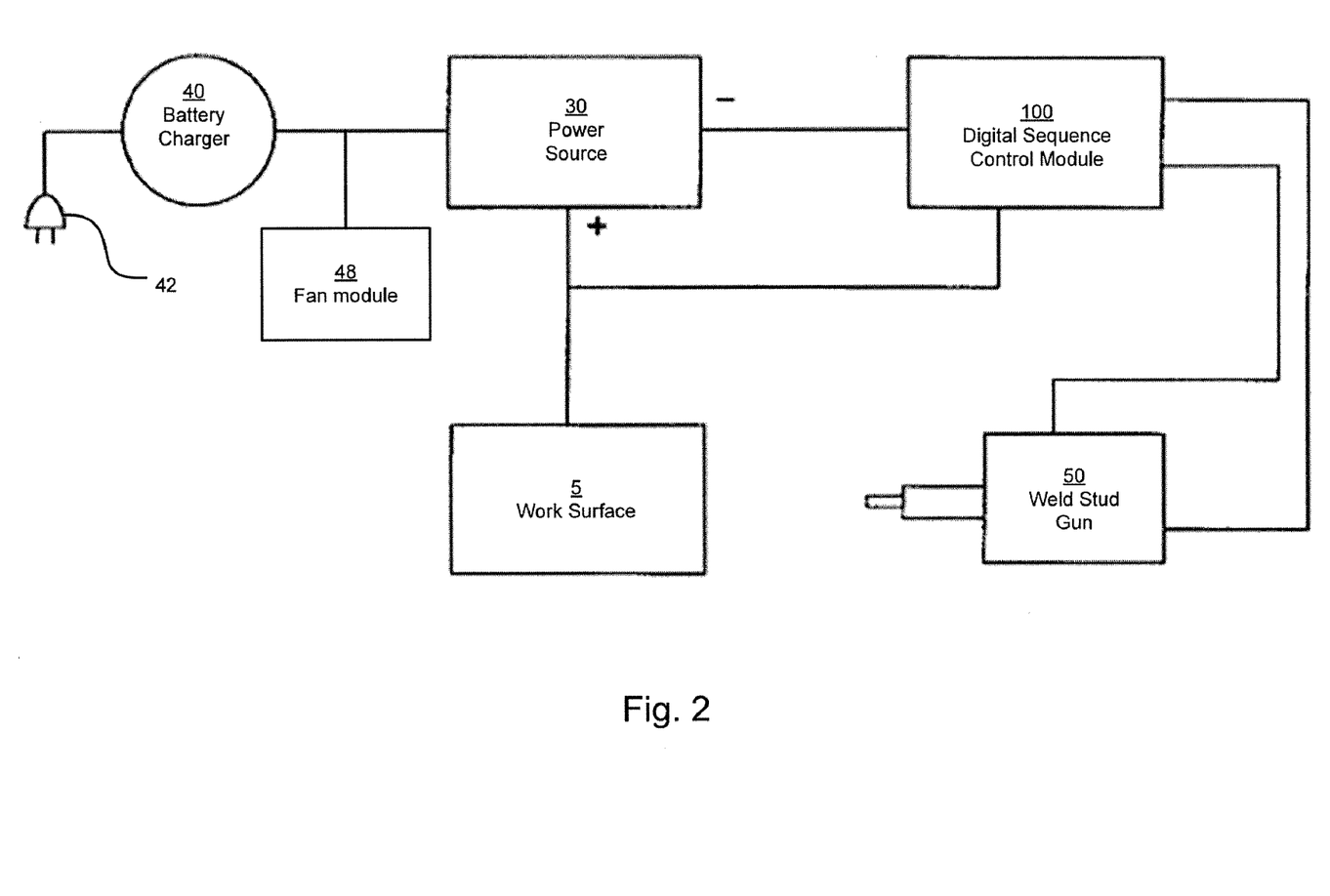
FIG. 2 is a schematic of an embodiment weld stud system that may be used in accordance with at least one aspect of the present invention.
Figure 3:
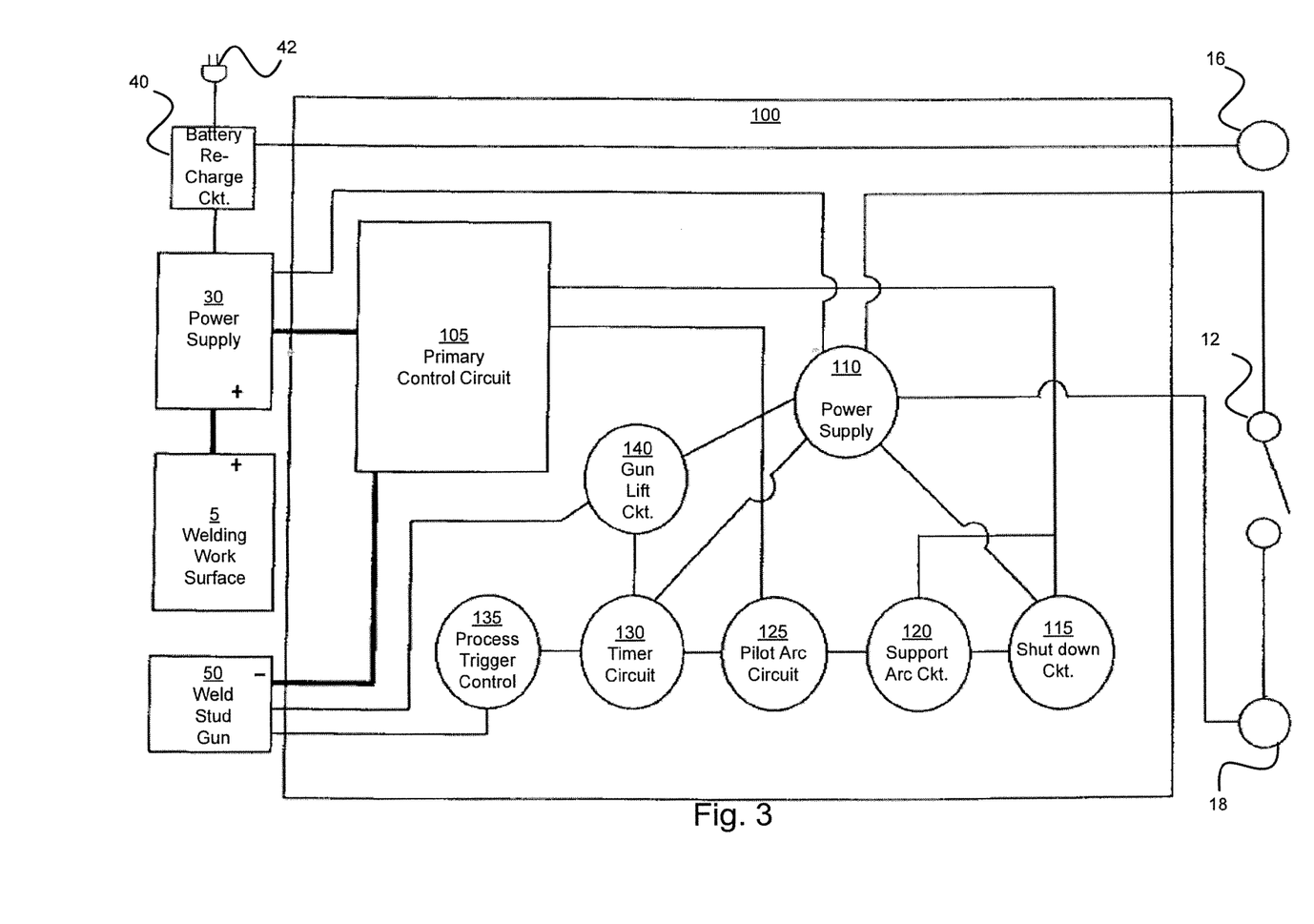
FIG. 3 is a schematic of a control module circuit that may be used in accordance with at least one aspect of the present invention.

FIGS. 2 and 3 illustrate schematics of an embodiment of a weld stud system. In an embodiment, the battery charger 40, the power source 30 and a solid state control module 100 may be positioned within the housing 10. The power cord 42, which may be detachably mounted to a recharging terminal 43 provided on the housing 10 (FIG. 4), can be used to ensure the power source 30 is properly charged and the fan module 48 (which may include a temperature sensor that can automatically engage the fan) can be used to ensure the temperature of the interior 10c (or particular components) does not become too high. Then, a weld signal from the weld stud gun 50 causes the control module 100 to provide a weld current through the weld stud gun 50 and the work surface 5.

It should be noted that heretofore, solid state components, while recognized as being compact, were generally unsuitable for use in high current applications such as drawn-arc welding. However, with the configuration of the control module, as described below, along with various other features of embodiments of the invention, such as the described batteries, a portable weld stud system that provides acceptable performance has become possible. For example, in an embodiment a system can be configured to weighs less than forty kilograms and in an embodiment the system may weigh less than thirty-two kilograms.

Figure 5:
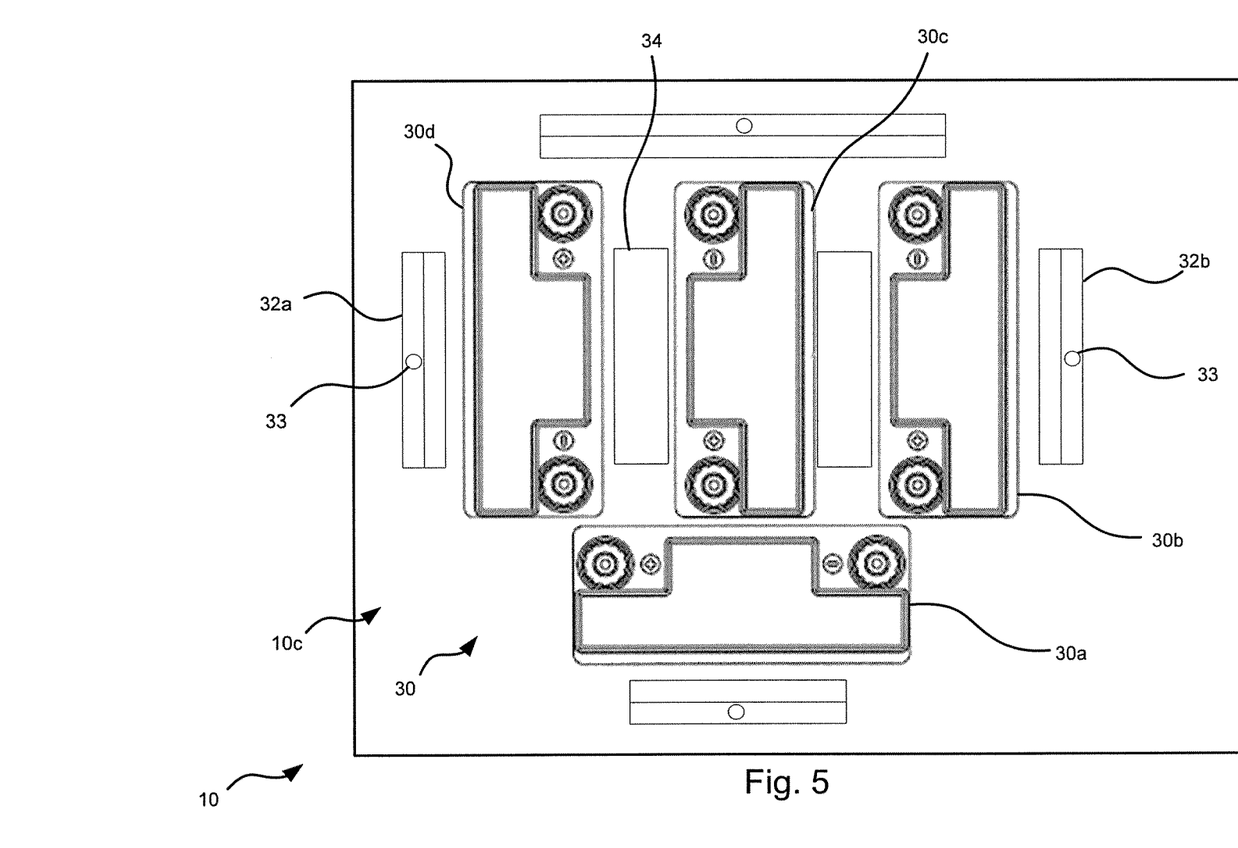
FIG. 5 is a top view of an embodiment of a system for supporting batteries in a housing that may be used in accordance with at least one aspect of the present invention.
Figure 6:
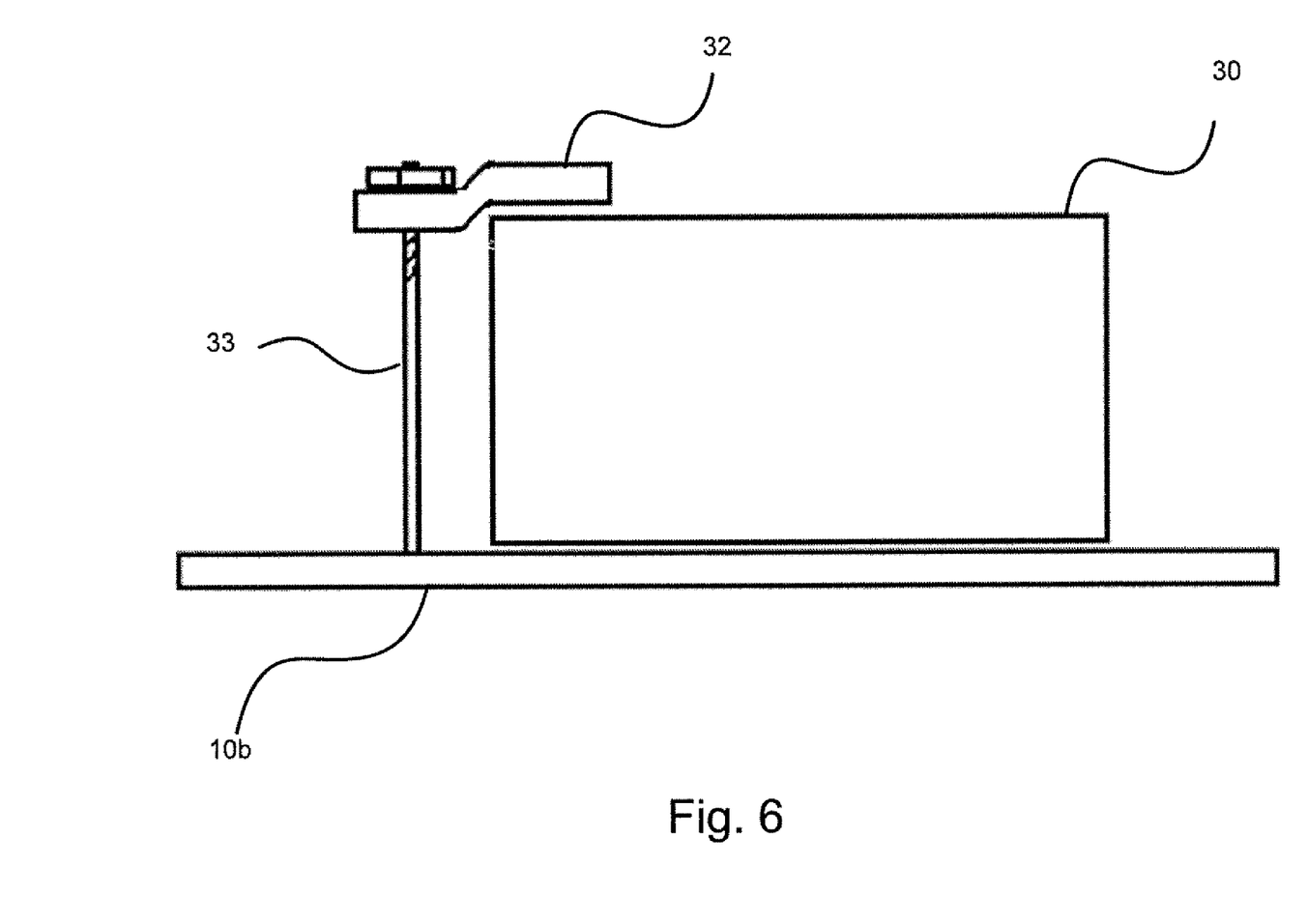
FIG. 6 is a partial cross section view of an embodiment of a system for restraining a battery that may be used in accordance with at least one aspect of the present invention.

To form a weld between the work surface 5 and the weld stud 60, current is allowed to flow from the power source 30, through a primary control circuit 105, through the weld stud gun 50, through the work surface 5 and back to the power source 30, the direction of current travel not being critical. In an embodiment, the primary circuit 105 may use three high current mosfet circuits in parallel (a suitable mosfet circuit includes INTERNATIONAL RECTIFIER Part No. FB180SA10) so that the required current can be routed through the control module 100 without the need for additional circuitry or damage being caused. In an embodiment, the selected mosfet circuit can provide a power dissipation of less than 500 watts during operation so as to minimize thermal load on the system. The power source 30 may be four 12-volt lead-acid batteries each with a thirteen amp-hour capacity so that the power source can provide 52 amp-hours of power and provides 48 volts of direct current (VDC). It should be noted that while twelve amp-hour batteries theoretically have only a slightly reduced capacity (about 8 percent less capacity), it is has been discovered that a battery with a thirteen amp-hr capacity provides an unexpected increase in welding performance, therefore making the weld stud system more desirable. An example of a suitable battery with a thirteen amp-hour capacity is a GENSIS XE13 12-volt sealed battery, which weighs about 5.5 kilograms and has a closed loop current of about 1300 amps, and can be used in a set of four batteries in series so as to provide 48 volts. It should be noted that a fully charged set of batteries may provide more than the rated amount for some predetermined number of discharge cycles (but after sufficient cycles may provide less than the rate amount). Therefore, depending on the power source design, eventually it may be desirable to replace it. If the XE13 is selected, the batteries may be supported in the housing 10 as depicted in FIG. 6, with angle brackets 32 coupled to a floor 10b of the housing 10 by bolts 33. In an embodiment, the brackets 32 and batteries 30a-30d may be arranged in the housing 10 as depicted in FIG. 5 and foam spacers 34 may be placed between one or more of the batteries 30a-30b so as to protect and cushion them.

To control the provision of the current, the control module 100 includes a main power supply circuit 110, which may be a 15 volt regulated power supply coupled to the power source 30. The main power supply circuit 110 is coupled to a switch 12 that turns the weld stud system 8 on and off (the state of which may be indicated by the light 18, which may be a light emitting diode (LED)). If the charging circuit 40 is incorporated within the housing 10, a power source status light 16 (which may be one or more LEDs) may be coupled to it so as to show the status of the power source 30 as well as the status of the charging circuit 40. It should be noted that while an alternating current power source is suitable for recharging the power source 30, an external direct current power source may also be used.

Figure 7A:
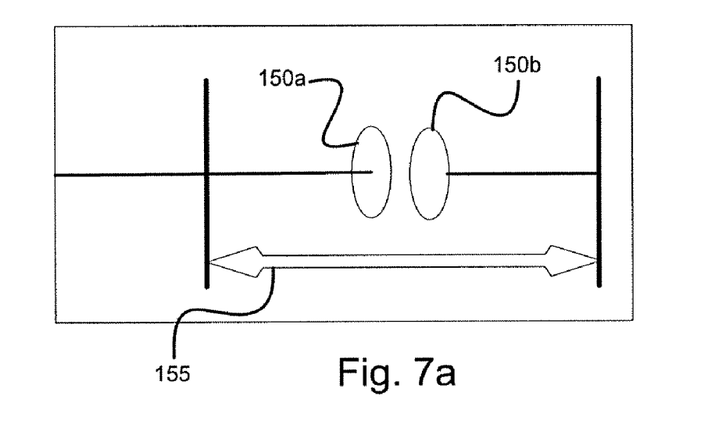
FIGS. 7a-7b are schematic views of two states of an weld stud lifting module that may be used in accordance with at least one aspect of the present invention.
Figure 7B:
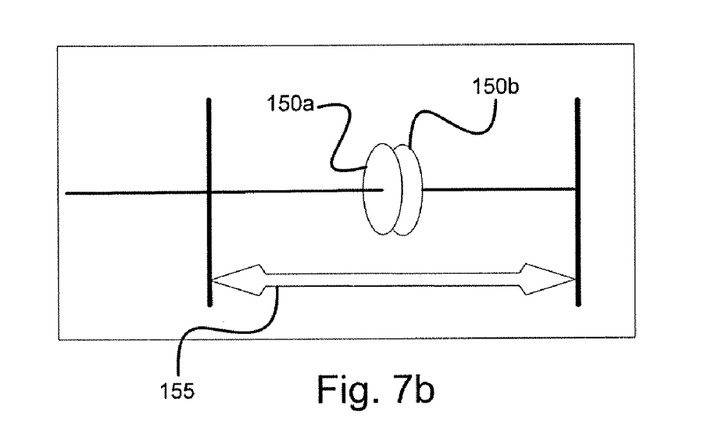

As is known, drawn arc stud welding typically first applies a voltage across a gap so as to generate an arc (known as a pilot arc) that creates an ionized path for the main weld current. Then, the system shapes and controls the arc by increasing the current flowing through the arc while moving (or drawing) the stud away from the work surface so that a desired amount of material is brought into a molten state. When the main power supply 110 is turned on and the weld stud gun 50 is activated, the primary control circuit 105 provides the power for the welding pulse. However, in an embodiment, a pilot arc circuit 125 (in conjunction with a support arc circuit 120 and a shut down circuit 115) can provide the initial current used to generate the arc. This can be controlled with a process trigger control 135 and a timer circuit 130, as illustrated. To move (or draw back) the stud 60, as illustrated in the schematic FIGS. 7a-7b, a weld gun lift circuit 140 provides power to a stud displacement coil 150a in the weld stud gun 50 that causes the weld stud 60 to be drawn back by pulling an adjacent disk 150b closer to the coil 150a (the disc 150b being mechanically coupled to the weld stud). This movement is resisted by a biasing element 155. Once current cases to flow through the stud displacement coil 150a, the biasing element 155 pushes the disc 150b away and in the process plunges the partially molten weld stud back into the partially molten work surface so as to allow the molten metals of the stud and the work surface to join and form the weld. Thus, the coil and the biasing element are an example of a lift solenoid that is used to control the position of the weld stud during the welding process. It should be noted that in an embodiment, the shut down circuit 115 can be configured to sense a short in response to delivery of 250 amps over 25-30 milliseconds.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A manually portable stud welding apparatus operable for stud welding without an external power source wherein a weld stud and a work surface are provided, both said weld stud and said work surface becoming partially molten by said apparatus in response to a direct welding current comprising in combination:

a manually portable housing;

a weld stud gun operatively carried by said housing, said stud gun including a lift solenoid mechanically attachable to a weld stud; said lift solenoid including a stud displacement coil with a biasing element;

a welding power source carried in said housing for providing the only source of the direct welding current, said welding power source consisting of multiple lead acid batteries in said housing, a charging circuit positioned within said housing, said charging circuit being configured to charge said welding power source, an electrical connection on said housing connectable to an external power source for receiving electrical power from said external power source and connected to said charging circuit, said charging circuit being attached to said electrical connection for receiving said electrical power from said external power source when said electrical connection is connected to said external power source only for charging said welding power source, said electrical connection being disconnected from said external power source for manual portability and for stud welding while being disconnected from said external power source, first and second leads within said housing connected to said weld stud gun and to said work surface to which said weld stud is to be welded;

a control lead within said housing connected to said stud gun for conducting a weld signal from said stud gun;

a control module carried in said housing for control of said direct welding current between said power source and said weld stud mechanically supported by said lift solenoid and between said power source and said work surface to which said weld stud is to be welded, said control module further including a plurality of mosfet weld current control circuits in parallel for controlled delivery of welding direct current from said lead batteries through said first and second leads and being adjustable between 100 and 1,100 milliseconds in response to a weld signal initiated by said stud gun through said control lead to said control module when stud welding;

said control module further including an arc circuit capable upon closure to initiate an arc between said weld stud and said work surface by delivery of said direct welding current from said lead batteries through said first and second leads to said stud and said work surface;

a timer for controlling the duration of said arc circuit closure;

a weld gun lift circuit for providing a stud displacement coil signal for withdrawing the stud from said work surface and for increasing current through a portion of said weld stud and said work surface to create a partially molten weld stud and a partially molten work surface; and a shut down circuit for controlling the duration of said coil signal, said coil signal normally being capable of upon ceasing to thereby enable said biasing element to plunge the partially molten stud into the partially molten work surface in response to said shut down circuit, said shut down circuit being designed to sense a short upon delivery of 250 amps over 25-30 milliseconds when direct welding current is being delivered to initiate an arc between said stud and said work surface, said weld stud gun, said lead acid batteries, said first and second leads, said control lead, said control module including said mosfet weld current control circuits, said timer, said weld gun lift circuit, and said shut down circuit being cooperatively interconnected to create an electrical direct current stud welding system for enabling said manually portable stud welding apparatus to be operable for said stud welding without connection to said external power source, provided said shut down circuit has not sensed said short, and said shut down circuit shutting down said direct welding current and said arc when said shut down circuit has sensed said short.

2. The apparatus of claim 1 wherein said power source provides 52 amp hours of capacity.

3. The apparatus of claim 2 wherein said power source comprises four 12 volt sealed lead acid batteries connected in series.

4. The apparatus of claim 1 wherein said housing and components carried by said housing weigh less than 32 kilograms.

5. The apparatus of claim 4 wherein said housing includes a handle for carrying said housing with the components carried by said housing.

6. The apparatus of claim 5 further comprising a power cord coupled to said charging circuit, and a compartment within said housing for storing said power cord.

7. The apparatus of claim 1 wherein said housing includes a door covered recess shaped to accept said weld stud gun.

8. The apparatus of claim 1 further comprising a fan module positioned in said housing, an air inlet and an air outlet with said fan module in gaseous communication with an electrical connection with said power source, and a temperature sensor connected to said fan module.

* * * * *